US012372681B1

(12) United States Patent
Nie et al.

(10) Patent No.: US 12,372,681 B1
(45) Date of Patent: Jul. 29, 2025

(54) FULL-DECAY INDUCED POLARIZATION DETECTION SYSTEM AND METHOD FOR WATER INRUSH IN TUNNELS

(71) Applicant: SHANDONG UNIVERSITY, Jinan (CN)

(72) Inventors: Lichao Nie, Jinan (CN); Shucai Li, Jinan (CN); Zhiqiang Li, Jinan (CN); Zhaoyang Deng, Jinan (CN); Yuancheng Li, Jinan (CN); Guoan Chu, Jinan (CN); Shaoyang Dong, Jinan (CN)

(73) Assignee: SHANDONG UNIVERSITY, Jinan (CN)

( * ) Notice: Subject to any disclaimer, the term of this patent is extended or adjusted under 35 U.S.C. 154(b) by 0 days.

(21) Appl. No.: 18/941,019

(22) Filed: Nov. 8, 2024

(30) Foreign Application Priority Data

Jun. 18, 2024 (CN) .......................... 202410780441.1

(51) Int. Cl.
*G01V 3/06* (2006.01)
(52) U.S. Cl.
CPC ..................................... *G01V 3/06* (2013.01)
(58) Field of Classification Search
None
See application file for complete search history.

(56) References Cited

U.S. PATENT DOCUMENTS 9,270,163 B2 * 2/2016 Shimura ................ G03G 15/80
9,317,575 B1 * 4/2016 Meran .................... G06F 16/275

FOREIGN PATENT DOCUMENTS

CN 103064121 A * 4/2013 ............ E21B 49/08
CN 103715894 A * 4/2014
EA 038707 B1 * 12/2014

OTHER PUBLICATIONS

Nie, Lichao et al. Full-decay induced polarization multi-parameter tomography method for tunnel water inrush ahead prospecting: A case study, Jan. 18, 2024 (Year: 2024).*

(Continued)

*Primary Examiner* — Emerson C Puente
*Assistant Examiner* — Michael Paul Mirabito
(74) *Attorney, Agent, or Firm* — IPRO, PLLC (57) ABSTRACT

The present invention provides a full-decay induced polarization (FDIP) detection system and method for water inrush in tunnels, comprising: through instructions for controlling constant-current high-power transmitting module and multi-channel parallel data acquisition and receiving module, receiving observation data and performing inversion by replacing minimum gradient support constraint to traditional smooth constraint, introducing data shape as prior information into inversion objective function, and constructing and solving focusing inversion formula of FDIP detection for water inrush in tunnels based on data shape constraint, to update model parameters; completing multi-source information acquisition of apparent resistivity, polarizability and the like and multi-parameter inversion imaging of zero-frequency resistivity, relaxation time, chargeability and frequency correlation coefficient, effectively reduce electromagnetic interference and improve detection efficiency, greatly meet the urgent requirement for detecting sudden water inrush disaster sources in front of tunnel face under construction, and having strong research significance and application value.

13 Claims, 3 Drawing Sheets

(56) References Cited

OTHER PUBLICATIONS

Portniaguine, Oleg et al. Focusing geophysical inversion images, May 1999 (Year: 1999).*
Weiqiang, Liu et al. Cole-Cole Model Parameter Estimation from Multi-frequency Complex Resistivity Spectrum Based on the Artificial Neural Network, Mar. 2021 (Year: 2021).*
De la Vega, M et al. Design of a Low-Cost Electrical Resistivity Meter for Near Surface Surveys, Nov. 19, 2021 (Year: 2021).*
Ma, Huan et al. Three-Dimensional Induced Polarization Parallel Inversion Using Nonlinear Conjugate Gradients Method, Apr. 27, 2015 (Year: 2015).*

* cited by examiner

FULL-DECAY INDUCED POLARIZATION DETECTION SYSTEM AND METHOD FOR WATER INRUSH IN TUNNELS

TECHNICAL FIELD

The present invention belongs to the technical field of advanced geological prediction, in particular, relates to a full-decay induced polarization (FDIP) detection system and method for water inrush in tunnels.

BACKGROUND OF THE INVENTION

The statements in this section merely provide background information related to the present invention and do not necessarily constitute prior art.

Sudden water inrush disaster in tunnel constructions seriously affects and restricts safe and efficient tunneling of tunnel. It is the critical requirement of active disaster prevention to find out the water inrush disaster source in front of tunnel face in advance. How to obtain the information of underground water-bearing structure is the key to find out the source of water inrush disaster. IP method of tunnel is based on the difference of electrical parameters between surrounding rock and water-bearing structure in tunnel, and has unique advantages in detecting water-bearing structure in front of tunnel face. It is one of the effective methods for predicting sudden water inrush disasters in tunnel constructions.

The FDIP detection method in tunnels takes whole attenuation curve as observation data, and can inverse the frequency correlation coefficient, zero-frequency resistivity, relaxation time and chargeability by using all information in the curve, which provides an innovative way for describing disaster water body from multiple angles. However, due to the fact that the whole attenuation curve is acquired, the whole acquisition process takes a long time, and the existing detection system equipment is large, cables are mostly used for connecting equipment, and wiring is complex, which leads to low acquisition efficiency; the secondary field signal of the tunnel time domain IP method is weak and the electromagnetic interference in the tunnel environment is serious; and, the traditional tunnel IP data interpretation module adopts smooth model constraint terms, and the inversion result is fuzzy in describing the electrical interface.

With the improvement of detection requirements and standards, the existing detection system cannot fully guide the tunnel safety construction in many aspects such as resolution, accuracy and efficiency. Specifically, there are the following problems:

(1) Tunnel construction environment is complex, in order to realize forward focusing depth exploration, multiple electrodes need to be arranged at the same time and the position of power supply point needs to be changed for many times, and the receiving module needs to collect all data for many times for storing; the FDIP detection system for water inrush in tunnels is connected and controlled by cables, moisture and dust are easy to enter instruments through interfaces, resulting in poor contact or even damage to the instruments, and detection person need to collect data near the tunnel face for a long time. Therefore, the FDIP method for water inrush in tunnels takes a long time to detect tunnels, and its efficiency is low; the detection person need to occupy the tunnel face and its rear area for a long time, which seriously affects the progress of tunnel construction and threatens the safety of the detection person.

(2) The secondary field signal of the tunnel time domain IP method is weak, in order to full use the information of the FDIP secondary field, a high-power transmitting module is needed. However, the high-power transmitting module will cause serious electromagnetic interference to the receiving module. In addition, traditional tunnel IP transmitting module has long turn-off time, which affects the quality of secondary field signal acquisition.

(3) The traditional tunnel IP data interpretation module uses smooth model constraints, and the inversion results are fuzzy to describe the electrical interface.

SUMMARY OF THE INVENTION

To solve above problems, the present invention provides a FDIP detection system and method for water inrush in tunnels, which can complete multi-source information acquisition of apparent resistivity, polarizability and the like and multi-parameter inversion imaging of zero-frequency resistivity, relaxation time, polarizability and frequency correlation coefficient, effectively reduce electromagnetic interference and improve detection efficiency, greatly meet the urgent requirement for detecting a sudden water inrush disaster source in front of a tunnel face under construction, and have strong research significance and application value.

According to some embodiments, the present invention adopts the following technical solution.

A FDIP detection system for water inrush in tunnels, comprising a constant-current high-power transmitting module, a multi-channel parallel data acquisition and receiving module, a data acquiring control and interpretation module, and an electrode module, wherein:

the electrode module comprises a measuring electrode array, a N electrode, and a plurality of power supply electrodes, each measuring electrode (M electrode) in the measuring electrode array and the N electrode is connected to the multi-channel parallel data acquisition and receiving module, and the plurality of power supply electrodes is connected to the constant-current high-power transmitting module through relays;

the constant-current high-power transmitting module responds to control instructions from the data acquiring control and interpretation module to perform constant-current output of signal sources and switching of power supply channels;

the multi-channel parallel data acquisition and receiving module responds to control instructions from the data acquiring control and interpretation module to perform channel switching between the each M electrode and acquisition of observation data; and the data acquiring control and interpretation module generates the control instructions for controlling the constant-current high-power transmitting module and the multi-channel parallel data acquisition and receiving module by setting transmission and acquisition parameters according to detection requirements, receives the observation data and performs an inversion operation; wherein, in a process of the inversion operation, replacing a minimum gradient support constraint to a traditional smooth constraint, introducing data shape as prior information into an inversion objective function, constructing and solving a focusing inversion formula of FDIP detection for water inrush in tunnels based on the data shape constraint, to update model parameters.

As an alternative implementation, the measuring electrode array is arranged on a tunnel face, and the plurality of power supply electrodes is arranged on at least one side of surrounding rock of a tunnel cavity.

As an alternative implementation, the constant-current high-power transmitting module comprises a power filter unit, a wireless data acquisition card and a plurality of power supply channels, wherein each of the plurality of the power supply channels is correspondingly connected to a power supply cable and comprises a switching power supply, a constant-current control unit, a multi-channel switching unit, a switching tube and a current sampling unit, and the power filter unit is used for connecting an alternating current power supply and a switching power supply;

the constant-current control unit and the switching power supply form a signal excitation source, the signal excitation source is connected to the multi-channel switching unit through an output voltage positive pole, the multi-channel switching unit distributes power supply directions, and constant-current control unit is also connected to the switching tube for controlling on/off of a path of current returning to a negative pole of the switching power supply, thereby forming a multi-channel negative feedback constant-current output loop;

the multi-channel switching unit switches power supply directions and corresponding power supply electrodes; the current sampling unit converts a current signal into a voltage signal;

the wireless data acquisition card is connected to the constant-current control unit, the multi-channel switching unit and the current sampling unit, to detect whether the multi-channel negative feedback constant-current output loop is turned off according to the voltage signal.

As a further implementation, the multi-channel switching unit performs a channel switching by using a mode of electrode bus A or electrode bus B, and a plurality of direction-switching relays and a plurality of electrode-gating relays are connected to the Electrode bus A or the Electrode bus B, wherein the direction-switching relays are configured to switch the power supply direction, and the electrode-gating relays are configured to gate the each of the plurality of power supply electrodes; the multi-channel switching unit controls the output voltage positive pole to be connected to either the Electrode bus A or the Electrode bus B, and the Electrode bus A or the Electrode bus B of the multi-channel switching unit is connected back to the constant-current control unit through the switching tube.

As a further implementation, the switch tube is a MOSFET tube.

As a further implementation, the wireless data acquisition card comprises an analog signal output (ASO) unit, an analog signal input (ASI) unit and a digital signal output (DSO) unit, wherein the ASO unit is connected to the constant-current control unit of each the channel, and the ASI unit is connected to the current sampling unit of each the channel.

As an alternative implementation, the multi-channel parallel data acquisition and receiving module comprises a wireless data transmission module, a power supply, a measuring-electrode channel switching unit and a data filtering and acquisition unit, wherein the wireless data transmission module outputs analog signals to control switching of the measuring-electrode channel switching unit, and the multi-channel parallel data acquisition and receiving module receives MN voltage signals between the each M electrode and the N electrode acquired by the data filtering and acquisition unit and transmits the acquired signals to the data acquiring control and interpretation module for data processing;

the measuring-electrode channel switching unit comprises a plurality of relays arranged in an array;

the power supply is connected to the wireless data transmission module and performs a voltage conversion through a DC/DC module, and is used for power supply of each the relay;

the data filtering and acquisition unit is configured to filter the acquired MN voltage signals.

As a further implementation, the data filtering and acquisition unit employs an 8th-order Bessel low-pass filter.

As an alternative implementation, the data acquiring control and interpretation module is connected to the constant-current high-power transmitting module and the multi-channel parallel data acquisition and receiving module in a wireless manner.

As an alternative implementation, the data acquiring control and interpretation module is configured to perform the steps of:

designing an initial parameter model;

constructing a forward acceleration algorithm of the FDIP detection for water inrush in tunnels, calculating a time-domain equivalent resistivity by using a filtering algorithm, and realizing a forward simulation of the FDIP detection for water inrush in tunnels based on a finite element method;

acquiring actual observation data or forward modeling data;

using the minimum gradient support constraint to replace the traditional smooth constraint, and introducing a determined data shape as a prior information into an inversion objective function, and constructing and solving the focusing inversion formula of the FDIP detection for water inrush in tunnels based on the data shape constraint, to obtain a zero-frequency resistivity, a relaxation time, a polarizability and a frequency correlation coefficient, and then obtaining an iterated model; and judging a convergence based on the difference between a forward result of the iterated model and a root mean square value of the observation data; if convergence occurs, drawing an inversion image of the selected area according to the iterated four model parameters; if not, returning to the step of constructing the forward acceleration algorithm of the FDIP detection for water inrush in tunnels.

As a further step, the focusing inversion formula of the FDIP detection for water inrush in tunnels based on the data shape constraint is:

$$\Phi = \varphi_d + \Delta\varphi_m + \lambda_1 \varphi_{d1}$$

wherein, a model constraint term is the minimum gradient support constraint:

$$\varphi_m = \sum_{n=1}^{N} \left( \frac{\nabla(m^{(n)} - m_{apr}^{(n)})}{\sqrt{(\nabla(m^{(n)} - m_{apr}^{(n)}))^2 + \beta^2}} \right)^2$$

wherein, $m^{(n)}$ is the $n^{th}$ model parameter, $m_{apr}^{(n)}$ is the $n^{th}$ prior model parameter, $\beta$ is the focus parameter, $\varphi_d$ is the data fitting term, $\Delta\varphi_m$ is the data constraint term, $\lambda_1 \varphi_{d1}$ is the data shape constraint term, and $\lambda$ is the coupling parameter.

Based on the fact that the observed data and simulated data are identical in fitting sum difference and curve shape is inconsistent, the data shape constraint term is constructed as follows:

$$\varphi_{d1} = \sum_{i=1}^{Q-1}((d_{i+1} - d_i) - (Am_{i+1} - Am_i))^2$$

wherein, the data shape constraint introduces the obtained deterministic known data shape information as the one data shape constraint term into the inversion of three-dimensional FDIP method, wherein $d_i$ is the $i^{th}$ measured data, $d_{i+1}$ is the $(i+1)^{th}$ measured data, $Am_i$ is the $i^{th}$ forward modeling data, $Am_{i+1}$ is the $(i+1)^{th}$ forward modeling data.

A working method of the system described above comprises the following steps:

arranging a measuring line and determining an electrode pole distance in a tunnel, arranging the measuring electrodes on a tunnel face of the tunnel, arranging the power supply electrodes a side face of surrounding rock of a cavity of the tunnel, connecting the measuring electrodes to the multi-channel parallel data acquisition and receiving module, and connecting the power supply electrodes to the constant-current high-power transmitting module;

switching on the constant-current high-power transmitting module, the multi-channel parallel data acquisition and receiving module, and the data acquiring control and interpretation module;

setting parameters such as current magnitude, duty cycle, power supply cycle, power supply and acquisition channel number;

measuring a grounding resistance, checking contact condition between the measuring electrodes and the surrounding rock, transmitting current by the constant-current high-power transmitting module after zeroing operation, and collecting full waveform by the multi-channel parallel data acquisition and receiving module; and saving and processing curves of the collected full waveform and data, by the data acquiring control and interpretation module, to complete multi-parameter high-resolution inversion imaging of anomalies in the detection area.

As an alternative implementation, the process of the curves and data processing by using the data acquiring control and interpretation module, comprising:

step 1: designing an initial parameter model;

step 2: constructing a forward acceleration algorithm of the FDIP detection for water inrush in tunnels, calculating a time-domain equivalent resistivity by using filtering algorithm, and realizing a forward simulation of the FDIP detection for water inrush in tunnels based on finite element method;

step 3: inputting actual observation data or forward modeling data;

step 4: using a minimum gradient support constraint to replace a traditional smooth constraint, while introducing a determined data shape as a prior information into an inversion objective function, and constructing and solving a focusing inversion formula of the FDIP detection for water inrush in tunnels based on the data shape constraint, to obtain a zero-frequency resistivity, a relaxation time, a polarizability and a frequency correlation coefficient, and then obtaining an iterated model; and step 5: judging a convergence based on the difference between a forward result of the iterated model and a root mean square value of the observation data the; if convergence occurs, drawing an inversion image of the selected area according to the iterated four model parameters; if not, returning to the step 2.

As a further step, in the step 2, performing node storage by introducing an array mapping method to realize fast node search, and performing the acceleration for the algorithm by using OpenMP parallel algorithm.

Compared with the prior art, the present invention has the beneficial effects that:

According to the present invention, a multi-channel adjustable high-current constant-current power supply module is developed, and multi-channel high-power constant-current output of the FDIP detection for water inrush in tunnels can be realized; and a multi-channel parallel data acquisition and receiving module is developed, and a multi-channel parallel data acquisition can be realized, which reduces detection time of the FDIP detection for water inrush in tunnels, and detection efficiency is effectively improved.

According to the present invention, the split design of the FDIP transmitting module and the receiving module is realized, the power filter unit and the filter acquisition unit are respectively integrated in the transmitting module and the acquisition module, the problem that the FDIP high-power transmitting module for the tunnel construction has serious electromagnetic interference on the receiving module is improved, the MOS tube is adopted to realize fast turn-off, more accurate induced polarization secondary field information can be acquired, and the acquisition signal quality of the FDIP detection for water inrush in tunnels is improved.

According to the present invention, wireless signal control and signal transmission are adopted, so that the problem of complex wiring of a traditional IP detection system for water inrush in tunnels is improved, the problem that poor contact may be caused by using cables in a complex tunnel environment is solved, the operation time of operators near a tunnel face is reduced, and the safety risk is reduced.

According to the present invention, the minimum gradient support constraint is adopted to replace the traditional smooth constraint, and the determined data form is taken as prior information to be introduced into an inversion objective function, so that the focusing inversion method of the FDIP detection for water inrush in tunnels based on the data form constraint is constructed and solved, and the problem that the traditional inversion result is fuzzy in describing an electrical interface is solved.

According to the present invention, the FDIP detection system for water inrush in tunnels is realized, multi-source information acquisition such as apparent resistivity, polarizability and the like and multi-parameter inversion imaging of zero-frequency resistivity, relaxation time, polarizability and frequency correlation coefficient can be completed, electromagnetic interference is effectively reduced, detection efficiency is improved, urgent requirements for detecting a sudden gushing water disaster source in front of a tunnel face are greatly met, and strong research significance and application value are achieved.

In order to make the above objectives, features, and advantages of the present invention more obvious and understandable, the following preferred embodiments are presented in detail with the accompanying drawings.

At least one specification heading is required. Please delete this heading section if it is not applicable to your application. For more information regarding the headings of the specification, please see MPEP 608.01(a).

BRIEF DESCRIPTION OF THE DRAWINGS

The accompanying drawings constituting a part of the present invention are used to provide a further understanding of the present invention. The exemplary examples of the present invention and descriptions thereof are used to explain the present invention, and do not constitute an improper limitation of the present invention.

Wherein: 1, data acquiring control and interpretation module; 2, constant-current high-power transmitting module; 3, multi-channel parallel data acquisition and receiving module; 4, power supply electrode; 5, measuring electrode group; 6, power supply filtering unit; 7, switching power supply; 8, constant-current control unit; 9, wireless acquisition card; 10, ASO unit; 11, ASI unit; 12, DSO unit; 13, current sampling unit; 14, multi-channel switching unit; 15, MOS-FET tube; 16, direction-switching relay; 17, electrode-gating relay; 18, M electrode channel switching unit; and 19, filtering acquisition unit.

DETAILED DESCRIPTION OF THE INVENTION

The present invention will now be further described with reference to the accompanying drawings and examples.

It should be pointed out that the following detailed descriptions are all illustrative and are intended to provide further descriptions of the present invention. Unless otherwise specified, all technical and scientific terms used in the present invention have the same meanings as those usually understood by a person of ordinary skill in the art to which the present invention belongs.

It should be noted that the terms used herein are merely used for describing specific implementations, and are not intended to limit exemplary implementations of the present invention. As used herein, the singular form is also intended to include the plural form unless the context clearly dictates otherwise. In addition, it should further be understood that, terms "comprise" and/or "comprising" used in this specification indicate that there are features, steps, operations, devices, components, and/or combinations thereof.

The embodiments and the features of the embodiments in the present invention may be combined with each other without conflict.

Embodiment 1

Figure 1:
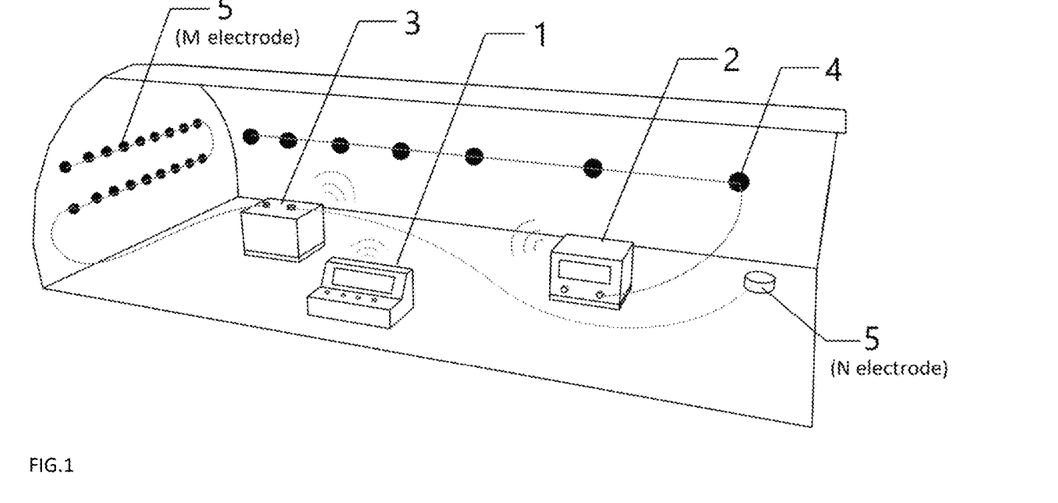
FIG. 1 is a block diagram of a system according to an embodiment of the present invention.

As shown in FIG. 1, a FDIP detection system for water inrush in tunnels, comprising a data acquiring control and interpretation module 1, a constant-current high-power transmitting module 2, a multi-channel parallel data acquisition and receiving module 3 and an electrode module; the electrode module comprises a plurality of power supply electrodes 4 and a measuring electrode group 5 those are connected to the constant-current high-power transmitting module 2 and the multi-channel parallel data acquisition and receiving module 3, respectively. Wherein, the measuring electrode group 5 comprising a measuring electrode array composed of several M electrodes that arranged on a tunnel surface of a tunnel and a N electrode arranged on the ground in the tunnel. According to the present embodiment, the constant-current high-power transmitting module 2 and the multi-channel parallel data acquisition and receiving module 3 are designed separately and respectively realize wireless communication with the data acquiring control and interpretation module 1.

Figure 2:
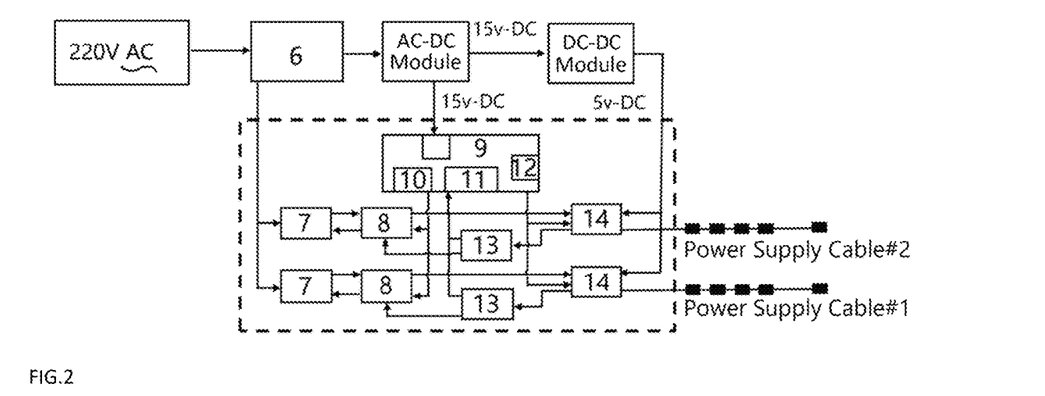
FIG. 2 is a schematic diagram of a structure principle of a constant-current high-power transmitting module according to an embodiment of the present invention.

As shown in FIG. 2, the constant-current high-power transmitting module comprises a power filter unit 6, a switching power supply 7, a constant-current control unit 8, a wireless acquisition card 9, a multi-channel switching unit 14 and a current sampling unit 13, and being configured to perform functions of a constant-current output of the signal source, a switching of power supply channels and an acquisition of current signals through control commands sent out by the data acquiring control and interpretation module 1.

The power filter unit 6 is connected to the switching power supply 7, and an AC power supply is filtered by the power filter unit 6 (an EMC filter unit is selected in the present embodiment) and then used as an AC input voltage of the switching power supply 7. The switching power supply 7 adopts a customized switching power supply, the highest output voltage is 1000V, and the maximum output current is 1 A.

After an analog voltage signal output by an ASO unit 10 in the wireless acquisition card 9, the constant-current control unit 8 and the switching power supply 7 form a signal excitation source, then constant-current is connected to the multi-channel switching unit 14 through an output voltage positive pole. The multi-channel switching unit 14 controls the output voltage positive pole to connect to electrode bus A (forward power supply) or the electrode bus B (reverse power supply), and the electrode bus A' (reverse power supply) or the Electrode bus B' (forward power supply) connected to the multi-channel switching unit 14 returns to the negative pole of the switching power supply 7 through the current sampling unit 13. Therefore, a multi-channel negative feedback constant-current output loop is formed, thereby realizing the output of multi-channel constant-current large current. A digital output unit 12 in the wireless acquisition card 9 controls the switching of the relay array in the multi-channel switching unit 14. The current sampling unit 13 is mainly a high-precision sampling resistor, and by converting the current signal into a voltage signal, a current in the feedback circuit can be detected by collecting a voltage at a front end point of the resistor by an ASI unit 11 in the wireless acquisition card 9.

Figure 3:
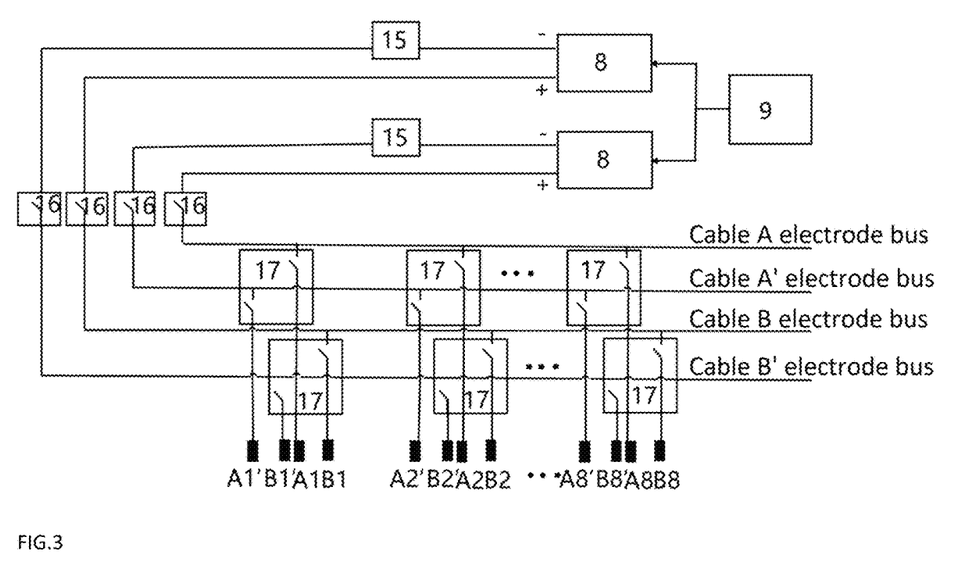
FIG. 3 is a schematic diagram of a principle of a channel switching unit of the constant-current high-power transmitting module according to an embodiment of the present invention.

As shown in FIG. 3, the multi-channel switching unit 14 is responsible for switching the electrodes, adopts the electrode buses A and B mode, switches the power supply direction through the direction-switching relay 16, and gates the 32 power supply electrodes through the electrode-gating relays 17. The relays have a group of normally open contacts, a group of switching contacts and a group of normally closed contacts, adopts relay multiplexing technology, can simultaneously switch A and B buses, and has higher integration degree. The output voltage positive pole is control to connect to the electrode bus A line or the electrode bus B line by the multichannel switching unit 14, and the MOS-FET transistors 15 are connected to the output of the electrode bus A line or the electrode bus B line in the multichannel switching unit 14 and returned to the constant-current control unit 8. The MOS-FET tube 15 is a switching device on the AB bus loop for fast switching of the current loop.

Figure 4:
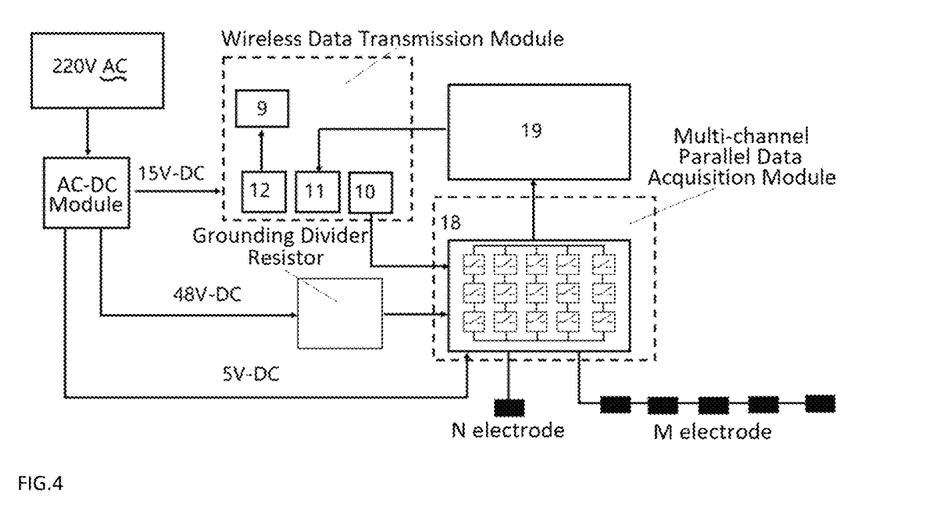
FIG. 4 is a schematic diagram of a structure principle of a multi-channel parallel data acquisition and receiving module according to an embodiment of the present invention.

As shown in FIG. 4, a wireless acquisition card 9, an M electrode channel switching unit 18, a filter acquisition unit 19 and a power supply are integrated in the multi-channel parallel data acquisition and receiving module 3. According to the instruction of the data acquiring control and interpretation module 1, a control signal is sent to the multi-channel parallel data acquisition and receiving module 3 to complete the channel switching and current signal acquisition functions.

The DSO unit 12 in the wireless acquisition card 9 controls the switching of the grounding resistor relay array in the M electrode channel switching unit 18. The ASI unit 11 in the wireless acquisition card 9 receives the MN voltage signal collected by the filtering acquisition unit 19 and transmits the collected signal to the host computer for data processing through Wi-Fi communication. The filtering acquisition unit 19 comprises a 20-channel isolation module and a filtering module, wherein the isolation module is used for isolating input voltage, the filtering module is used for filtering the acquired MN voltage signal, an 8-order Bessel low-pass filter is adopted, the turning angle frequency is 20 Hz, and the signal attenuation can reach −60 dB at 50 Hz.

The power supply is directly output to the wireless acquisition card for power supply, and a DC/DC module converts the 12V DC output voltage into 48V and 5V DC voltages for power supply of the grounding voltage dividing resistor and the relay part.

The data acquiring control and interpretation module 1 is connected to the constant-current high-power transmitting module 2 and the multi-channel parallel data acquisition and receiving module 3 respectively in a wireless manner, and mainly completes the functions of signal excitation, channel switching and signal acquisition and processing. In addition, the data acquiring control and interpretation module 1 can realize interpretation of FDIP data, and in order to solve the technical problems existing in the background art, the interpretation software provides a focusing inversion method of the FDIP detection for water inrush in tunnels based on data shape constraints, and the inversion method realizes the transformation from single-parameter imaging to four-parameter collaborative imaging of a water disaster body, so that the inversion result accurately characterizes the boundary of an abnormal body.

Figure 5:
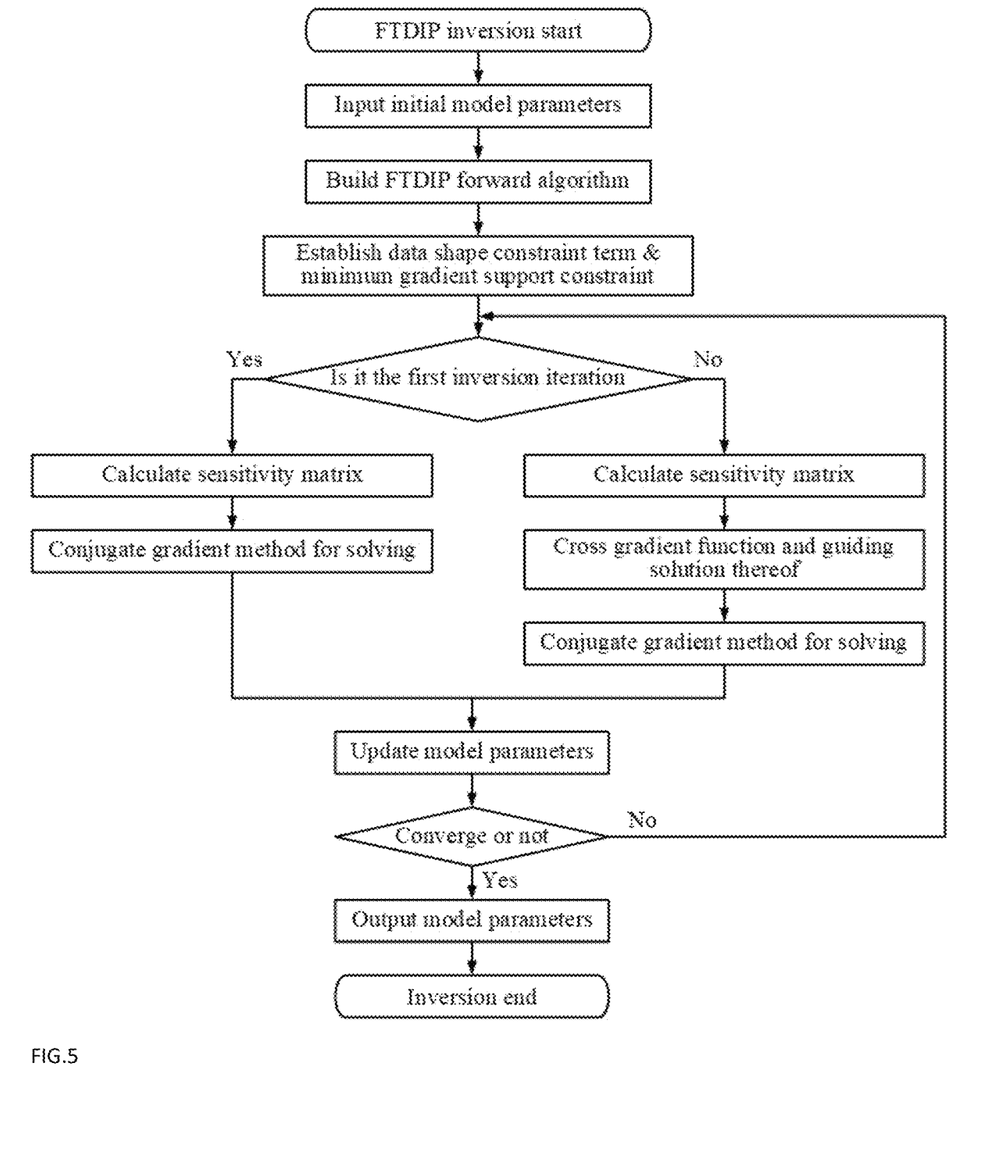
FIG. 5 is a flowchart of a focusing inversion method of FDIP detection for water inrush in tunnels based on data morphology constraints according to an embodiment of the present invention.

The focusing inversion method of the FDIP detection for water inrush in tunnels comprises the following steps:

Step 1: carrying out geological investigation and analysis on a detection area, and designing a uniform initial model $m_0$.

Step 2: constructing a forward acceleration algorithm of the FDIP detection for water inrush in tunnels, calculating a time-domain equivalent resistivity by using filtering algorithm, and realizing a forward simulation of the FDIP detection for water inrush in tunnels based on finite element method.

In the present embodiment, in order to further improve the forward calculation efficiency, an array mapping method is introduced for node storage to realize fast node searching, and the Chorisky decomposition method is accelerated by combining the OpenMP parallel algorithm, so that the forward calculation efficiency of the FDIP is effectively improved.

Specifically, in the filter algorithm formula, a transfer function involves from frequency domain data to time domain data is as follows:

$$\rho(\omega) = \rho_{dc}\left(1 - m\left[1 - \frac{1}{1+(i\omega\tau)^c}\right]\right)$$

wherein, $\rho_{dc}$ is the zero-frequency resistivity, m is the intrinsic susceptibility, T is the relaxation time, c is the frequency correlation coefficient, and ω is the angular frequency.

Step 3: inputting actual observation data or forward simulation data $d_0$.

Step 4: replacing the traditional smooth constraint with the minimum gradient support constraint, simultaneously introducing the determine data shape as a prior information into an inversion objective function, constructing and solving a focusing inversion formula of the FDIP detection for water inrush in tunnels based on the data shape constraint, obtaining four model parameter increments of the zero-frequency resistivity, the relaxation time, the polarizability and the frequency correlation coefficient, and further obtaining the iterated model parameters.

Specifically, the focusing inversion formula of the FDIP detection for water inrush in tunnels based on the data shape constraint is as follows:

$$\Phi = \varphi_d + \lambda\varphi_m + \lambda_1\varphi_{d1}$$

wherein, using the minimum gradient support constraint as the model constraint term, as follows:

$$\varphi_m = \sum_{n=1}^{N}\left(\frac{\nabla(m^{(n)} - m_{apr}^{(n)})}{\sqrt{(\nabla(m^{(n)} - m_{apr}^{(n)}))^2 + \beta^2}}\right)^2$$

wherein, $m^{(n)}$ is the $n^{th}$ model parameter, $m_{apr}^{(n)}$ is the $n^{th}$ prior model parameter, β is the focus parameter, $\varphi_d$ is the data fitting term, $\lambda\varphi_m$ is the data constraint term, $\lambda_1\varphi_{d1}$ is the data shape constraint term, and A is the coupling parameter.

Based on the fact that the observed data and simulated data are identical in fitting sum difference and curve shape is inconsistent, the data shape constraint term is constructed as follows:

$$\varphi_{d1} = \sum_{i=1}^{Q-1}((d_{i+1} - d_i) - (Am_{i+1} - Am_i))^2$$

wherein, the data shape constraint introduces the obtained deterministic known data shape information as the one data shape constraint term into the inversion of three-dimensional FDIP method, wherein $d_i$ is the $i^{th}$ measured data, $d_{i+1}$ is the $(i+1)^{th}$ measured data, $Am_i$ is the $i^{th}$ forward modeling data, $Am_{i+1}$ is the $(i+1)^{th}$ forward modeling data.

Step 5: judging a convergence based on the difference a forward result G(m) of the iterated model and a root mean square (RMS) value of the observation data $d_0$; if convergence occurs, drawing an inversion image of the detection area according to the iterated four model parameters; if not, returning to the step 2.

Embodiment 2

A working method of the system provided in Embodiment 1, comprising the following steps:

Step 1: laying electrodes and connecting instruments. Wherein, arranging a measuring line and determining an electrode pole distance in a tunnel, arranging the measuring electrodes on a tunnel face of the tunnel, arranging the power supply electrodes a side face of surrounding rock of a cavity of the tunnel, connecting the measuring electrodes to the multi-channel parallel data acquisition and receiving module, and connecting the power supply electrodes to the constant-current high-power transmitting module.

Step 2: turning on the instruments. Wherein, externally connecting the power supply, switching on a constant-current high-power transmitting module, a multi-channel parallel data acquisition and receiving module, and a data acquiring control and interpretation module.

Step 3: setting emission acquisition parameters. Wherein, setting parameters such as current magnitude, duty cycle, power supply cycle, power supply and acquisition channel number.

Step 4: detecting and measuring. Wherein, measuring a grounding resistance, checking contact condition between the measuring electrodes and the surrounding rock, transmitting current by the constant-current high-power transmitting module after zeroing operation, and collecting full waveform by the multi-channel parallel data acquisition and receiving module.

Step 5: data saving and interpreting. Wherein, saving and processing curves of the collected full waveform and data, by the data acquiring control and interpretation module, to complete multi-parameter high-resolution inversion imaging of anomalies in the detection area.

The process of processing the data by using the data acquiring control and interpretation module has been described in Embodiment 1, and is not repeated here.

Those skilled in the art should understand that the examples of the present invention can be provided as methods, systems, or computer program products. Therefore, the present invention may take the form of hardware examples, software examples, or examples combining software and hardware aspects. Furthermore, the present invention may take the form of a computer program product implemented on one or more computer usable storage media (including but not limited to disk memory, CD-ROM, optical memory, etc.) containing computer usable program codes.

The present invention is described with reference to flowcharts and/or block diagrams of methods, devices (systems), and computer program products according to the examples of the present invention. It should be understood that each of the processes and/or boxes in the flowchart and/or block diagram, and the combination of the processes and/or boxes in the flowchart and/or block diagram, may be implemented by computer program instructions. These computer program instructions may be provided to a processor of a general purpose computer, a specialized computer, an embedded processor, or other programmable data processing device to produce a machine such that the instructions executed by the processor of the computer or other programmable data processing device produce a device for implementing the functions specified in one process or multiple processes of the flowchart and/or one box or multiple boxes of the block diagram.

These computer program instructions may also be stored in a computer-readable memory capable of directing the computer or other programmable data processing apparatus to operate in a particular manner such that the instructions stored in such computer-readable memory produce an article of manufacture comprising an instruction device that implements the function specified in one process or a plurality of processes of the flowchart and/or one box or a plurality of boxes of the block diagram.

These computer program instructions may also be loaded onto a computer or other programmable data processing device to enable a series of operational steps to be performed on the computer or other programmable device to generate a computer implemented process, so that instructions executed on a computer or other programmable device provide steps for implementing functions specified in one process or a plurality of processes of the flowchart and/or in one box or a plurality of boxes of the block diagram.

The foregoing descriptions are merely preferred embodiments of the present invention but are not intended to limit the present invention. A person skilled in art may make various alterations and variations to the present invention. Any modification, equivalent replacement, or improvement made within the spirit and principle of the present invention shall fall within the protection scope of the present invention.

The invention claimed is:

1. A system comprising: a transmitting module, a multi-channel parallel data acquisition and receiving module, a data acquiring control and interpretation module and an electrode module,
   wherein the electrode module comprises a measuring electrode array and a plurality of power supply electrodes, each measuring electrode in the measuring electrode array is connected to the multi-channel parallel data acquisition and receiving module, and the plurality of power supply electrodes is connected to the transmitting module;
   wherein the transmitting module comprises a power filter unit, a wireless data acquisition card and a plurality of power supply channels;
   wherein each power supply channel of the plurality of power supply channels is connected to a power supply cable and comprises a switching power supply, a constant-current control unit, a multi-channel switching unit, a transistor and a current sampling unit, and the power filter unit is configured to connect an alternating current power supply to the switching power supply;
   wherein:
      the constant-current control unit and the switching power supply form a signal excitation source, the signal excitation source is connected to the multi-channel switching unit through a positive pole of the switching power supply, and the constant-current control unit is connected to the transistor controlling a path of current returning to a negative pole of the switching power supply;
      the multi-channel switching unit is configured to switch power supply directions and select at least one power supply electrode from the plurality of power supply electrodes;
      the current sampling unit is configured to convert a current signal into a voltage signal; and
      the wireless data acquisition card is connected to the constant-current control unit, the multi-channel switching unit and the current sampling unit, and is configured to determine a state of the transistor based on the voltage signal;
   wherein the transmitting module is configured to, in response to control instructions from the data acquiring control and interpretation module, to selectively supply a constant-current output to at least one power supply channel of the plurality of power supply channels;

wherein the multi-channel parallel data acquisition and receiving module is configured to, in response to the control instructions, perform channel switching in the measuring electrode array and acquire observation data; and wherein the data acquiring control and interpretation module is configured to generate the control instructions, and to receive the observation data and to perform an inversion operation on the observation data.

2. The system according to claim 1, wherein the measuring electrode array is configured to be mounted to a tunnel face and the plurality of power supply electrodes is configured to be mounted to sidewall of a tunnel cavity.

3. The system according to claim 1, wherein the transistor is a MOSFET.

4. The system according to claim 1, wherein the wireless data acquisition card comprises an analog signal output (ASO) unit, an analog signal input (ASI) unit and a digital signal output (DSO) unit, wherein the ASO unit is connected to the constant-current control unit, and the ASI unit is connected to the current sampling unit.

5. The system according to claim 1, wherein the multi-channel parallel data acquisition and receiving module comprises a wireless data transmission module, a power supply, a measuring-electrode channel switching unit and a data filtering and acquisition unit, wherein the wireless data transmission module is configured to output analog signals to control switching of the measuring-electrode channel switching unit, and the multi-channel parallel data acquisition and receiving module is configured to receive voltage signals between each measuring electrode and an electrode connected to the multi-channel parallel data acquisition and receiving module and acquired from the data filtering and acquisition unit, and is configured to transmit the voltage signals to the data acquiring control and interpretation module;

wherein the measuring-electrode channel switching unit comprises a plurality of relays arranged in an array;

wherein the power supply is connected to the wireless data transmission module and is configured to perform a voltage conversion through a DC/DC module, and is configured to power the plurality of relay; and wherein the data filtering and acquisition unit is configured to filter the voltage signals.

6. The system according to claim 5, wherein the data filtering and acquisition unit comprises an 8th-order Bessel low-pass filter.

7. The system according to claim 1, wherein the data acquiring control and interpretation module is wirelessly connected to the transmitting module and the multi-channel parallel data acquisition and receiving module.

8. A system comprising: a transmitting module, a multi-channel parallel data acquisition and receiving module, a data acquiring control and interpretation module and an electrode module, wherein the electrode module comprises a measuring electrode array and a plurality of power supply electrodes, each measuring electrode in the measuring electrode array is connected to the multi-channel parallel data acquisition and receiving module, and the plurality of power supply electrodes is connected to the transmitting module;

wherein the transmitting module comprises a power filter unit, a wireless data acquisition card and a plurality of power supply channels;

wherein each power supply channel of the plurality of power supply channels is connected to a power supply cable and comprises a switching power supply, a constant-current control unit, a multi-channel switching unit, a transistor and a current sampling unit, and the power filter unit is configured to connect an alternating current power supply to the switching power supply;

wherein the transmitting module is configured to, in response to control instructions from the data acquiring control and interpretation module, to selectively supply a constant-current output to at least one power supply channel of the plurality of power supply channels;

wherein the multi-channel parallel data acquisition and receiving module is configured to, in response to the control instructions, perform channel switching in the measuring electrode array and acquire observation data; and wherein the data acquiring control and interpretation module is configured to generate the control instructions, and to receive the observation data and to perform an inversion operation on the observation data;

wherein the multi-channel parallel data acquisition and receiving module comprises a wireless data transmission module, a power supply, a measuring-electrode channel switching unit and a data filtering and acquisition unit, wherein the wireless data transmission module is configured to output analog signals to control switching of the measuring-electrode channel switching unit, and the multi-channel parallel data acquisition and receiving module is configured to receive voltage signals between each measuring electrode and an electrode connected to the multi-channel parallel data acquisition and receiving module and acquired from the data filtering and acquisition unit, and is configured to transmit the voltage signals to the data acquiring control and interpretation module;

wherein the measuring-electrode channel switching unit comprises a plurality of relays arranged in an array;

wherein the power supply is connected to the wireless data transmission module and is configured to perform a voltage conversion through a DC/DC module, and is configured to power the plurality of relay; and wherein the data filtering and acquisition unit is configured to filter the voltage signals.

9. The system according to claim 8, wherein the measuring electrode array is configured to be mounted to a tunnel face and the plurality of power supply electrodes is configured to be mounted to a sidewall of a tunnel cavity.

10. The system according to claim 8, wherein the transistor is a MOSFET.

11. The system according to claim 8, wherein the wireless data acquisition card comprises an analog signal output (ASO) unit, an analog signal input (ASI) unit and a digital signal output (DSO) unit, wherein the ASO unit is connected to the constant-current control unit, and the ASI unit is connected to the current sampling unit.

12. The system according to claim 8, wherein the data filtering and acquisition unit comprises an 8th-order Bessel low-pass filter.

13. The system according to claim 8, wherein the data acquiring control and interpretation module is wirelessly connected to the transmitting module and the multi-channel parallel data acquisition and receiving module.

* * * * *